United States Patent
Richardson et al.

(10) Patent No.: US 6,905,531 B2
(45) Date of Patent: *Jun. 14, 2005

(54) PROCESS FOR THE DISSOLUTION OF COPPER METAL

(75) Inventors: Hugh W. Richardson, Sumter, SC (US); Gang Zhao, Sumter, SC (US)

(73) Assignee: Phibro Tech, Inc., Ridgefield Park, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 10/660,795

(22) Filed: Sep. 12, 2003

(65) Prior Publication Data

US 2005/0034563 A1 Feb. 17, 2005

Related U.S. Application Data

(63) Continuation of application No. 10/074,251, filed on Feb. 14, 2002, now Pat. No. 6,646,147.

(51) Int. Cl.$^7$ ................................................ C07F 1/08
(52) U.S. Cl. ....................................... 75/711; 556/113
(58) Field of Search ........................... 75/711; 556/113

(56) References Cited

U.S. PATENT DOCUMENTS

| | | |
|---|---|---|
| 2,377,966 A | 6/1945 | Reed et al. |
| 3,375,713 A | 4/1968 | Edelstein |
| 3,929,598 A | 12/1975 | Stern et al. |
| 3,930,834 A | 1/1976 | Schulteis et al. |
| 3,936,294 A | 2/1976 | Childress |
| 4,324,578 A | 4/1982 | Seymour et al. |
| 4,578,162 A | 3/1986 | McIntyre et al. |
| 4,622,248 A | 11/1986 | Leach et al. |
| 4,808,407 A | 2/1989 | Hein et al. |
| 4,929,454 A | 5/1990 | Findlay et al. |
| 5,078,912 A | 1/1992 | Goettsche et al. |
| 5,084,201 A | 1/1992 | Greco |
| 5,186,947 A | 2/1993 | Goettsche et al. |
| 5,304,666 A | 4/1994 | McLain |
| 5,431,776 A | 7/1995 | Richardson et al. |
| 6,294,071 B1 | 9/2001 | Miller et al. |
| 6,484,883 B1 | 11/2002 | Edelstein |
| 6,646,147 B2 * | 11/2003 | Richardson et al. ........ 556/113 |
| 2004/0016909 A1 | 1/2004 | Zhang et al. |

FOREIGN PATENT DOCUMENTS

| | | |
|---|---|---|
| CA | 2262186 | 9/1999 |
| NZ | 334310 | 1/2001 |

* cited by examiner

Primary Examiner—Melvyn Andrews
(74) Attorney, Agent, or Firm—Morgan, Lewis & Bockius LLP

(57) ABSTRACT

Process for producing a copper-containing aqueous solution, in which a copper mass is dissolved in the presence of an oxidant in an aqueous leach liquor containing monoethanolamine and $(HMEA)_2CO_3$. The leach liquor is produced by partially carbonating the monoethanolamine.

58 Claims, 6 Drawing Sheets

A Batch Dissolver

A Batch Dissolver

A Schematic for Continuous Production of the MEA Complex of Copper Solution

Copper Dissolution vs Air Flow Rate Continuous @ pH = 9.8

Copper Dissolution vs. Air Flow Rate Continuous @ pH = 9.5

PROCESS FOR THE DISSOLUTION OF COPPER METAL

CROSS-REFERENCE TO RELATED APPICATIONS

This application is a continuation of application Ser. No. 10/074,251 filed on Feb. 14, 2002, now U.S. Pat. No. 6,646,147 B2, the entire content of which is hereby incorporated by reference in this application.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

SEQUENCE LISTING

Not Applicable

BACKGROUND OF THE INVENTION

1. Field of the Invention

The present invention relates to a process for the dissolution of copper metal. More particularly, the invention relates to a process for producing a copper-containing aqueous solution by dissolving copper in the presence of an oxidant in an aqueous leach liquor containing monoethanolamine and (monoethanolammonium)$_2$ carbonate (HMEA)$_2$CO$_3$.

2. Description of the Prior Art

It is known to employ copper-containing aqueous solutions as biocidal fluids, for example, for the pressure treatment of lumber and for water purification. Examples of such fluids and uses thereof may be found, for example, in U.S. Pat. No. 4,929,454 and U.S. Pat. No. 6,294,071. The copper-containing solutions may be formulated, for example, by dissolving copper in aqueous solutions containing alkyl amines or alkyl hydroxy amines, such as 2-hydroxyethylamine.

Alternatively, copper-containing solutions may be produced by reacting copper oxide with chromic acid and arsenous acid to produce a solution of the copper with chrome and arsenic. The solution is subsequently diluted with water and the resulting aqueous solution may be injected into wood under pressure.

This chromated copper arsenate ("CCA") is the primary additive used in the treatment of wood against termite and other biological infestation. Although the CCA is very effective, it has come under increased pressure because of the environmental concerns associated with chromium and arsenic.

A new generation of pesticide is now emerging that appears to be efficacious, and which relies on the use of copper (in larger quantities than in the CCA) in combination with other pesticidal components, such as quaternary amines and triazoles. The copper is typically applied as a solution of the monoethanolamine complex of copper carbonate or borate. The commercial form of the copper concentrate usually contains about 100 to 130 g/l copper which is diluted with water prior to injection into the wood.

The copper complex is typically produced commercially by the dissolution of basic copper carbonate in a solution of monoethanolamine (MEA), followed by further carbonation or addition of boric acid. The reactions can be approximately represented by the following equations:

$$CuCO_3 \cdot Cu(OH)_2 + 7MEA \rightarrow Cu(MEA)_{3.5}CO_3 + Cu(MEA)_{3.5}(OH)_2$$

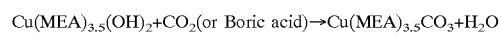

$$Cu(MEA)_{3.5}(OH)_2 + CO_2 \text{(or Boric acid)} \rightarrow Cu(MEA)_{3.5}CO_3 + H_2O$$

The production of the copper carbonate precursor has its own production and raw material costs, and a brine waste is generated which gives rise to environmental concerns. A more efficient process might be to produce the complex without the aid of an isolated precursor. It is known from the prior art that ammonia and carbon dioxide in water can be used to dissolve copper metal with oxygen from air as the oxidant. This is represented by the following equation:

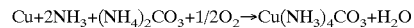

$$Cu + 2NH_3 + (NH_4)_2CO_3 + 1/2O_2 \rightarrow Cu(NH_3)_4CO_3 + H_2O$$

The reaction proceeds well and has been the basis for copper dissolution in several commercial facilities. However, if the ammonia is not initially carbonated, the kinetics are very poor which makes the process unattractive from a commercial standpoint.

A need exists for a more efficient process for producing copper-containing aqueous solutions, suitable for use in the wood-treatment industry. The present invention seeks to fill that need.

SUMMARY OF THE INVENTION

It has been discovered, according to the present invention, that it is possible to efficiently produce copper-containing solutions directly without initially producing or isolating a precursor such as copper carbonate. The present invention accordingly provides a process for producing a copper-containing aqueous solution, wherein a copper mass is dissolved in the presence of an oxidant in an aqueous leach liquor containing monoethanolamine and (monoethanolammonium)$_2$ carbonate (HMEA)$_2$CO$_3$, the leach liquor being produced by partially carbonating the monoethanolamine. According to the process, copper-containing solution may be produced in 8–12 hours or less, more usually within about 8 hours or less.

BRIEF DESCRIPTION OF THE DRAWINGS

The present invention will now be described in more detail with reference to the accompanying drawings, in which.

DETAILED DESCRIPTION OF THE INVENTION

Figure 1:
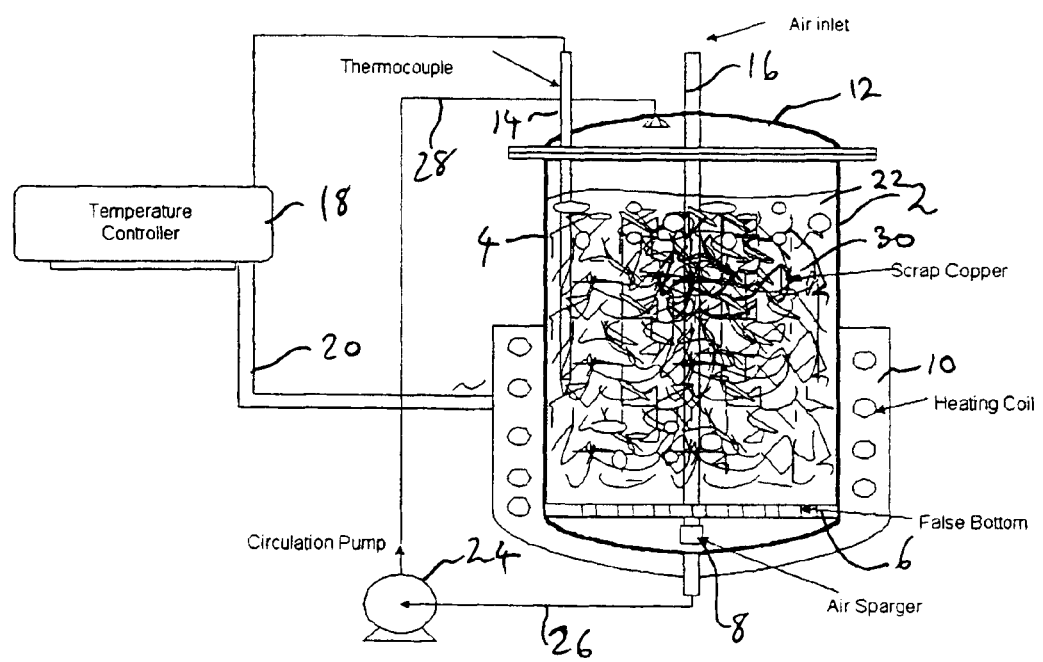
FIG. 1 is a schematic depiction of a batch dissolver to be used for performing the present invention in a batch-wise manner.

Referring to FIG. 1, there is shown a batch dissolver, generally referenced 2, having a chamber 4, with a false bottom 6, and an air sparger 8 located below the false bottom. The chamber is surrounded by a heating coil 10 and has a top 12 through which extend a thermocouple 14 and an air inlet 16. The thermocouple is connected to a temperature control unit 18 and supplies heat to the heating coil 10 through conduit 20. Leach liquor 22 is circulated through the chamber by circulation pump 24 through lines 26, 28. Copper metal 30, typically scrap copper, is present in the chamber and immersed in the leach liquor to enable the dissolution to occur.

The term "copper" as used herein means copper metal, including scrap copper, such as for example copper wire, copper clippings, copper tubing, copper cabling and/or copper plate, compounds of copper, such as copper oxide, and/or mixtures of copper metal and copper compounds.

The term "copper mass" as used herein refers to copper metal in a form which, when present in the chamber, is permeable to the leach liquor and which presents high surface area for contact with the leach liquor to thereby expedite dissolution of the copper. The copper mass may be present for example as a three-dimensional open permeable network, such as a bale of scrap copper comprised of copper wire, copper tubing, copper cabling, copper plates, providing voids between the copper pieces to allow free flow and maximum contact of the leach liquor with the copper. A bale may have a volume of for example about 25–100 cubic feet. Alternatively, the copper mass may be present in the chamber as smaller irregular shaped pieces resembling "popcorn" ("blister shot") having an average dimension of about 1–3", which allow for good permeation of the leach liquor between and around the copper pieces to expedite dissolution thereof. Typically, the ratio of copper surface area to volume of leach liquor for this process versus a standard agitated reactor is about 10–20:1, for example about 15:1.

Advantageously, the dissolution process is done at a temperature between 40° C. and 80° C., for example between 45° C. and 55° C.

According to the process, the copper mass is dissolved in the presence of an oxidant in an aqueous leach liquor containing monoethanolamine and $(HMEA)_2CO_3$. Typically, for a 1 liter chamber, the air flow SCFH ranges from about 2–20, for example 3–10. The air flow SCFH will increase as the volume of the chamber increases.

The leach liquor is produced by partially carbonating the monoethanolamine and may be generated externally of the dissolver or in situ in the chamber through addition of carbon dioxide to the monoethanolamine/water solution by sparging or bubbling into the chamber. Usually, the leach liquor is produced externally of the chamber and introduced into the chamber into contact with the copper as required, or recirculated as necessary.

The equation that represents the overall reaction is as follows:

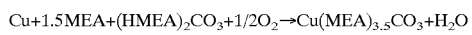

$$Cu+1.5MEA+(HMEA)_2CO_3+1/2O_2 \rightarrow Cu(MEA)_{3.5}CO_3+H_2O$$

The equation that represents the in situ or external partial carbonation of the monoethanolamine is as follows:

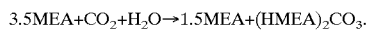

$$3.5MEA+CO_2+H_2O \rightarrow 1.5MEA+(HMEA)_2CO_3.$$

The amount of carbon dioxide introduced during the process is controlled such that partial carbonation occurs to form $(HMEA)_2CO_3$. Typically, the carbon dioxide is present in an amount of about 5–30% by weight, for example about 8–12% by weight.

The MEA is usually present in an amount of about 30–40 wt %, more usually 35–38 wt %. A typical aqueous leach solution of comprises about 36 wt % MEA and about 10% by weight carbon dioxide.

The monoethanolamine complex of copper carbonate solutions are typically prepared by dissolving the copper mass in a monothanolamine/$CO_2$/$H_2O$ solution. The dissolution may be carried out in a batch dissolver (see FIG. 1), or may be performed as a continuous process in towers packed with copper (see FIG. 4). Typically, the copper and MEA/$CO_2$/$H_2O$ solution are charged into the dissolver, and the circulation pump, air-flow and temperature controller are actuated. Examples of conditions are given in Table 3 below.

The present inventors have discovered that it is not necessary to utilize precursors, such as copper carbonate which is expensive. The dissolution of the copper metal may be achieved in the presence of MEA, $(HMEA)_2CO_3$ and an oxidant at elevated temperature, without the need for the addition of ammonium compounds such as ammonium hydroxide, fungicidal anions, polyamines, carboxylic acids, alkali metal hydroxides such as sodium hydroxide, and/or alcohol-based solvents.

The dissolution of the copper metal is performed in the presence of an oxidant. Typically the oxidant is an air and/or oxygen, most usually air sparging.

The leach solution is typically re-circulated in the reactor. Most typically, the re-circulation is carried out at a constant rate, and may be, for example, a constant rate of about one-tenth of the leach solution volume per minute.

The process may be carried out at atmospheric pressure and at a temperature of 25–100° C., for example 45–65° C. Typically, the temperature is maintained at 45–55° C.

The pH is typically maintained in the basic region, i.e. greater than 7, and is usually from about 8.0–11.3, more usually 9–10. The pH is usually maintained by addition of carbon dioxide as acid, or MEA as base.

The reaction proceeds slowly where there is a small surface area of copper available to contact the leach solution. For example, if the contact area of the copper metal to leach solution is doubled, the rate of the process doubles assuming adequate air-distribution.

It has been found that an aerated packed tower containing copper metal and circulating leach liquor is the most preferred method for commercial purposes. The advantage of using a packed tower is that it maintains a relatively high surface area to solution volume of copper metal.

According to another embodiment of the present invention, it is possible to utilize a reactor that contains a bed of copper and can be rotated while being heated and aerated.

Figure 4:
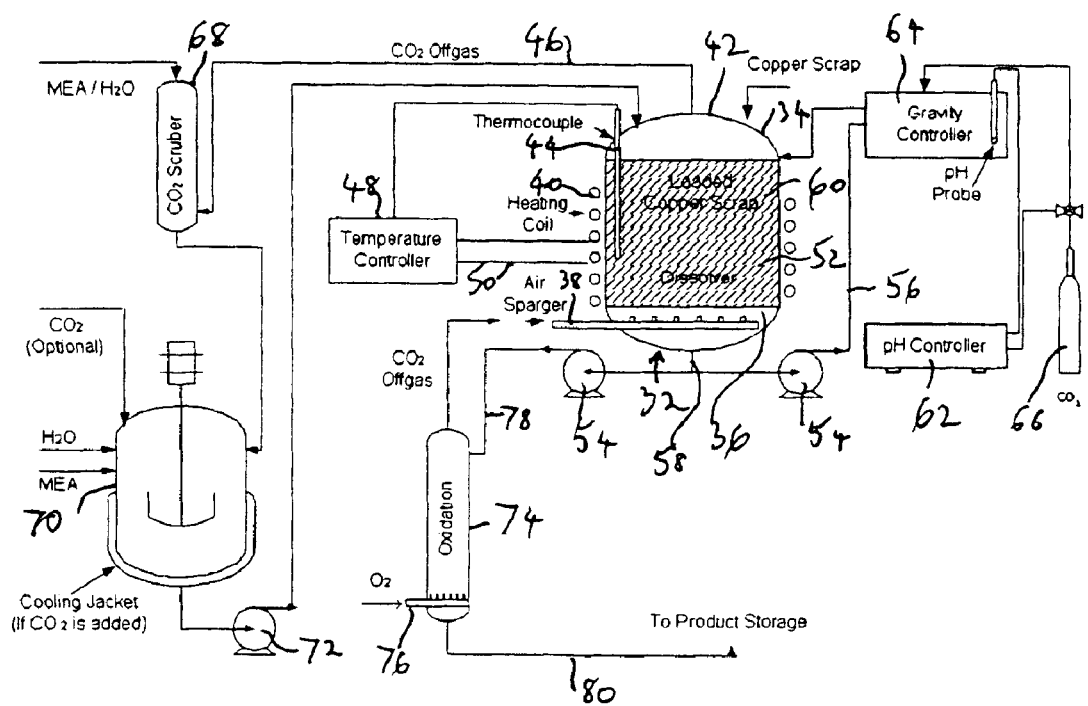
FIG. 4 is a schematic for continuous production of MEA complex of copper solution.

Dissolving studies were conducted either batch-wise or continuously. FIG. 1 shows a conventional batch dissolver used for the batch-wise operation. FIG. 4 shows a continuous dissolution process. The conditions used in the batch experiments are given in Table 1. The temperature was maintained at 45–55° C.

TABLE 1

| | | Leach Solution | | | |
|---|---|---|---|---|---|
| EXP. # | ID | Amine, % | $CO_2$, % | Volume, ml | Cu Charge, g |
| 1 | MEA-$CO_2$ solution | 36.7 | 12 | 600 | 400 |
| 2 | MEA-$CO_2$ solution | 35.9 | 13 | 200 | 200 |

The leach solutions are typically re-circulated in the reactor. Most typically, the re-circulation is carried out at a constant rate of about one-tenth of the leach solution volume per minute. The solution concentration of copper (g/l) as a function of dissolution time is shown in Table 2:

TABLE 2

| | Dissolution Time, hour | | | | | | | |
|---|---|---|---|---|---|---|---|---|
| EXP. # | 1 | 2 | 3 | 4 | 5 | 6 | 7 | 8 |
| 1 | 3.7 | 15.7 | 41.3 | 67.8 | 88.2 | 100.3 | | |
| 2 | 5.4 | 16.8 | 55.7 | 85.1 | 102.5 | 119.2 | 126.4 | 136.1 |

In experiments 1 and 2 reported above, average copper dissolution rates of about 17 g/l-hr were achieved over the course of the experiments. At those rates, the process is viable commercially. Raw material costs, processing costs and waste are significantly reduced over the conventional process using copper carbonate.

FIG. 4 is a schematic for the continuous production of MEA complex in solution. The dissolver, generally referenced 32, has a chamber 34, with a false bottom 36, and an air sparger 38 located below the false bottom. The chamber is surrounded by a heating coil 40 and has a top 42 through which extend a thermocouple 44 and an outlet 46. The thermocouple is connected to a temperature control unit 48 and supplies heat to the heating coil 40 through conduit 50. Leach liquor 52 is circulated through the chamber by circulation pumps 54 through lines 56, 58. A copper mass 60 is present in the chamber and immersed in the leach liquor to enable the dissolution to occur. The system is also provided with a pH control 62 connected to a gravity controller 64 into which carbon dioxide is admitted from tank 66. Carbon dioxide off-gas is directed through line 46 to a carbon dioxide scrubber 68. Carbon dioxide from the scrubber 68 is the fed to chamber 70 containing MEA and water which is pumped via pump 72 to chamber 34. The system also comprises an oxidation chamber 74 into which oxygen is admitted via line 76. Product enters at line 78 and following oxidation exits via line 80 and is transferred to product storage.

EXAMPLES

Examples of the process according to the present invention will now be described.

Example 1

Batch Preparation of Monoethanolamine Complex of Copper Carbonate

Monoethanolamine complex of copper carbonate solutions were prepared by dissolving a copper metal mass in monothanolamine/$CO_2$/$H_2O$ solution in the batch dissolver in the presence of air sparging and at an elevated temperature. FIG. 1 shows a conventional batch dissolver used for the batch-wise operation.

Three experiments were conducted using the batch dissolver shown in FIG. 1. In each experiment, about 1200 g copper and 1 liter MEA-$CO_2$—$H_2O$ solution were charged into the dissolver. The circulation pump, airflow and temperature controller were then started. The experimental conditions are given in Table 3.

TABLE 3

| | MEA-$H_2O$—$CO_2$ Solution | | | Air Flow | | Circulation Rate |
|---|---|---|---|---|---|---|
| Exp ID | MEA/$H_2O$[1] | % $CO_2$ | Sp.G | SCFH | Temperature ° C. | ml/min |
| 1 | 0.900/1.00 | 13.7 | 1.165 | 6.0 | 51 ± 1 | 182 |
| 2 | 0.733/1.00 | 14.1 | 1.160 | 6.0 | 51 ± 1 | 182 |
| 3 | 0.900/1.00 | 13.7 | 1.165 | 6.0 | 76 ± 1 | 182 |

[1]Weight ratio

Figure 2:
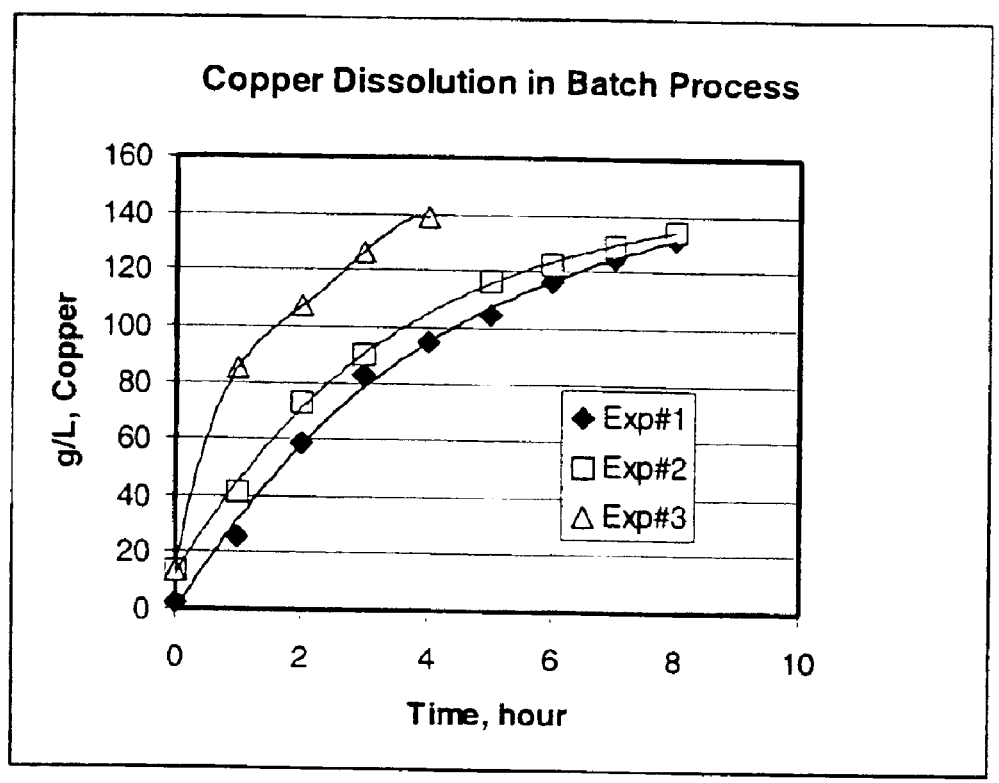
FIG. 2 is a plot showing the copper dissolution in the batch process.
Figure 3:
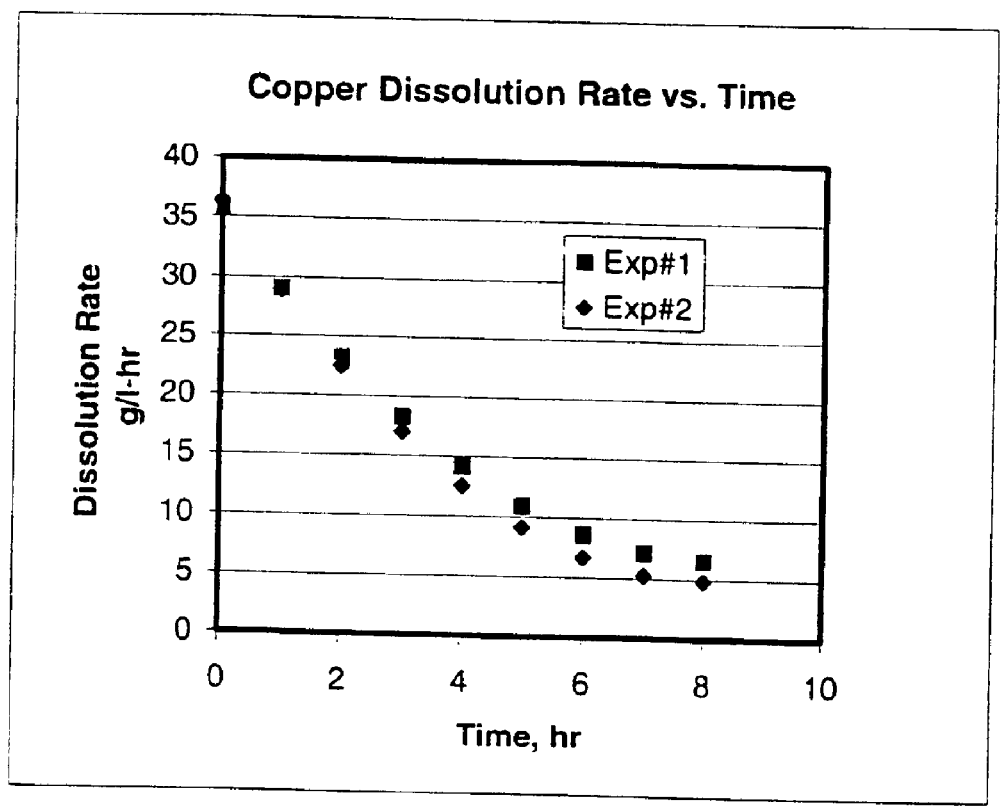
FIG. 3 is a plot showing the copper dissolution rate as a function of time.

When temperature reached the target temperature, the first sample of each batch was taken for analysis, and the timer was started. Complete results of these three dissolving batches are shown below, and are presented in FIGS. 2 and 3. FIG. 2 is a plot showing the copper dissolution in the batch process, and FIG. 3 is a plot showing the copper dissolution rate as a function of time.

TABLE 4

| Batch Dissolving - Experiment #1 | | | | |
|---|---|---|---|---|
| Time, hour | % Cu | pH | Sp.G. | Copper, g/L |
| 0 | 0.16 | 8.8 | 1.165 | 1.9 |
| 1 | 2.155 | 9.6 | 1.175 | 25.3 |
| 2 | 4.85 | N/a | 1.205 | 58.4 |
| 3 | 6.73 | 9.45 | 1.228 | 82.6 |
| 4 | 7.66 | 9.6 | 1.239 | 94.9 |

TABLE 4-continued

Batch Dissolving - Experiment #1

| Time, hour | % Cu | pH | Sp.G. | Copper, g/L |
|---|---|---|---|---|
| 5 | 8.36 | 9.6 | 1.251 | 104.5 |
| 6 | 9.23 | 9.6 | 1.262 | 116.5 |
| 7 | 9.79 | N/a | 1.271 | 124.4 |
| 8 | 10.32 | 9.65 | 1.277 | 131.8 |

TABLE 5

Batch Dissolving - Experiment #2

| Time, hour | % Cu | pH | Sp.G. | Copper, g/L |
|---|---|---|---|---|
| 0 | 1.17 | 9.00 | 1.170 | 13.7 |
| 1 | 3.5 | 9.25 | 1.180 | 41.3 |
| 2 | 6.07 | 9.30 | 1.204 | 73.1 |
| 3 | 7.37 | 9.37 | 1.223 | 90.1 |
| 4 | | | | |
| 5 | 9.29 | 9.55 | 1.250 | 116.1 |
| 6 | 9.76 | 9.65 | 1.258 | 122.7 |
| 7 | 10.23 | 9.65 | 1.265 | 129.4 |
| 8 | 10.63 | 9.65 | 1.267 | 134.7 |

TABLE 6

Batch Dissolving - Experiment #3

| Time, hour | % Cu | Ph | Sp.G. | Copper, g/L |
|---|---|---|---|---|
| 0 | 1.175 | 9.45 | 1.175 | 13.8 |
| 1 | 7.054 | 9.80 | 1.208 | 85.2 |
| 2 | 8.661 | 10.0 | 1.237 | 107.1 |
| 3 | 10.11 | 10.2 | 1.251 | 126.4 |
| 4 | 10.99 | 10.3 | 1.267 | 139.2 |

Example 2

Figure 5:
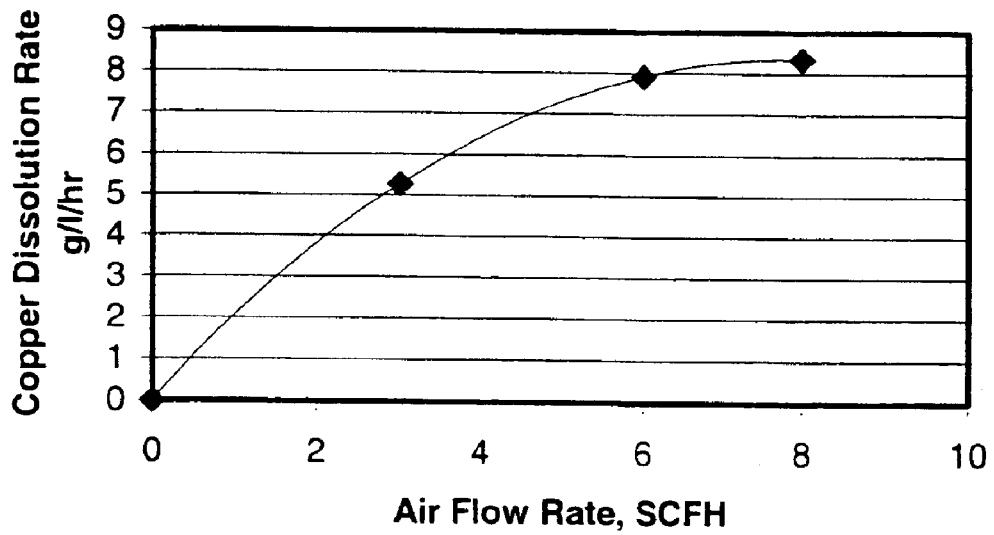
FIG. 5 is a plot showing the copper dissolution rate versus air flow rate in a continuous process at pH 9.8.
Figure 6:
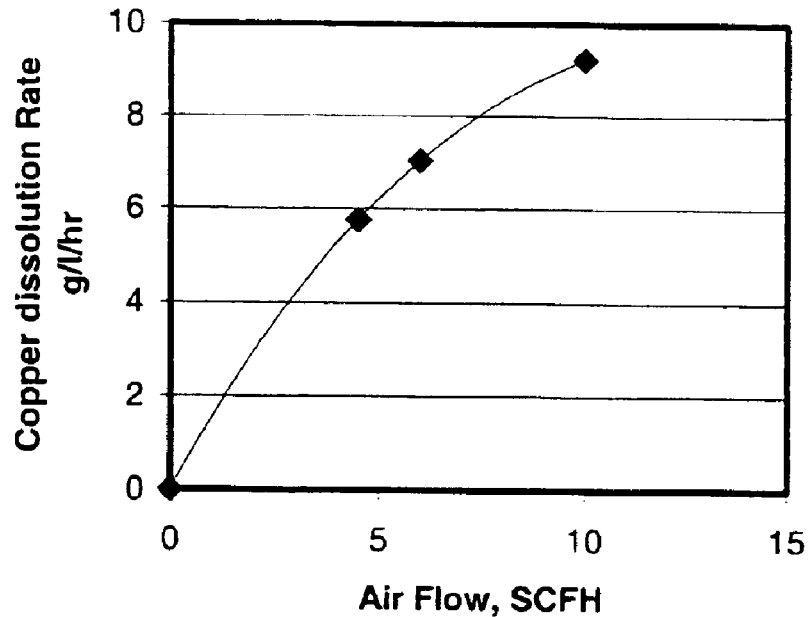
FIG. 6 is a plot showing the copper dissolution rate versus air flow rate in a continuous process at pH 9.5.
Figure 7:
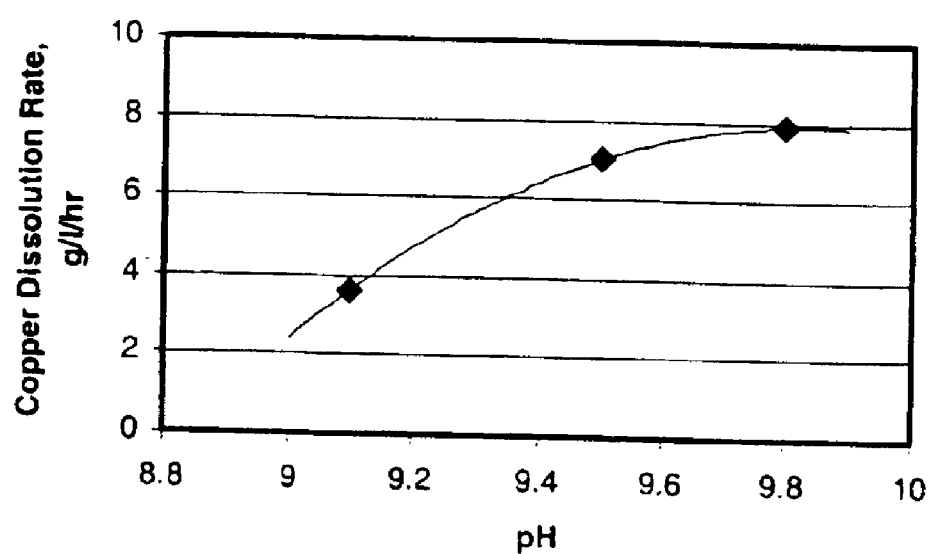
FIG. 7 is a plot showing the copper dissolution rate as a function of pH.

A continuous dissolver assembly (see FIG. 4) was used in the experiments described below. The assembly includes a one-liter size packed-tower dissolver (used in the batch dissolving experiments described above); gravity controller, a temperature controller, a pH monitor, an air flow meter, a circulation pump and a pump for simultaneous withdraw and replenish of solutions. The gravity controller held about 1 liter of the product solution. The solution in the assembly was circulated between the gravity controller and the dissolver at a constant rate of 325 ml/mm. Occasionally, $CO_2$ gas was bubbled through the bottom of the gravity control chamber to adjust the pH of the solution. In all experiments described below, the reaction temperature and specific gravity were controlled at 50°+−2° C. (i.e. from 48° C. to 52° C.) and 1.271.+−0.001 g/ml, respectively. During a continuous dissolving experiment, copper is continuously dissolved and results in a gradual increase of the specific gravity of the copper-containing solution. When the gravity reaches a pre-set value, i.e. 1.272, it triggers a pump to withdraw the product solution and replenish MEA-$CO_2$ solution simultaneously. The composition of the MEA-$CO_2$ solution used in all continuous dissolving experiments is the same as that of Exp#1 of batch process (Table 3). The dissolver was charged on a daily basis with 1" pieces of 11–13 AWG scrap copper wires and maintained a total copper loading of 1100–1200 grams at any given period of the experiments. Results are shown below in Table 7 along with the experimental conditions used, and are also presented in FIGS. 5–7. FIG. 5 is a plot showing the copper dissolution rate versus air flow rate in a continuous process at pH 9.8, FIG. 6 is a plot showing the copper dissolution rate versus air flow rate in a continuous process at pH 9.5 and FIG. 7 is a plot showing the copper dissolution rate as a function of pH.

TABLE 7

Conditions and Results of Continuous Dissolving Experiments

| Duration | | Air Flow | MEA-Cu—$CO_2$ Solution | | Copper Dissolution |
|---|---|---|---|---|---|
| Hour | pH | SCFH | Volume, ml | Copper, % | g/l/hr |
| 2.13 | 9.8 | 6.0 | 125 | 10.61 | 7.91 |
| 2.13 | 9.8 | 3.0 | 85 | 10.41 | 5.28 |
| 0.65 | 9.8 | 8.0 | 41 | 10.41 | 8.35 |
| 3.35 | 9.5 | 6.0 | 183 | 10.15 | 7.05 |
| 0.64 | 9.5 | 10.0 | 46 | 10.15 | 9.27 |
| 0.78 | 9.5 | 4.5 | 35 | 10.15 | 5.79 |
| 4.1 | 9.1 | 6.0 | 123 | 9.575 | 3.65 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A batch process for producing a copper-containing aqueous solution product comprising between 100 and 130 grams of dissolved copper per liter, said process comprising:

providing to a batch reactor an initial aqueous leach liquor comprising water, monoethanolamine, and $(HMEA)_2CO_3$, wherein said $(HMEA)_2CO_3$ is produced by partially carbonating a composition comprising aqueous monoethanolamine;

providing to the batch reactor a copper mass, wherein the molar ratio of copper in the copper mass to total monoethanolamine in the composition is greater than 1 to 3.5;

providing to the batch reactor air, oxygen, or mixture thereof; and contacting the leach liquor with the air, oxygen, or mixture thereof and with the copper mass, thereby causing dissolution of a portion of the copper mass and forming the copper-containing aqueous solution product, wherein the temperature of the leach liquor is maintained at a temperature between 25° C. and 100° C., wherein the amount of dissolved copper in the copper-containing aqueous solution product is between 100 grams per liter and 130 grams per liter in 12 hours or less.

2. The process of claim 1, wherein the step of partially carbonating the monoethanolamine comprises contacting an aqueous monoethanolamine composition with carbon dioxide, wherein the initial aqueous leach liquor comprises between about 30% and about 40% by weight of total monoethanolamine and between about 8% and about 12% by weight of carbon dioxide.

3. The process of claim 1, wherein the amount of dissolved copper in the copper-containing aqueous solution product is between 100 grams per liter and 130 grams per liter in 8 hours or less.

4. The process of claim 1, wherein the temperature of the leach liquor is maintained at a temperature between 45° C. and 65° C., and wherein the amount of dissolved copper in the copper-containing aqueous solution product is between 100 grams per liter and 130 grams per liter in 8 to 12 hours.

5. The process of claim 1, wherein the temperature of the leach liquor is maintained at a temperature between 40° C. and 80° C., and wherein the amount of dissolved copper in the copper-containing aqueous solution product is between 100 grams per liter and 130 grams per liter in 8 hours or less.

6. The process of claim 2, wherein the temperature of the leach liquor is maintained at a temperature between 45° C. and 65° C., and wherein the amount of dissolved copper in the copper-containing aqueous solution product is between 100 grams per liter and 130 grams per liter in 8 hours or less.

7. The process of claim 1, wherein the initial aqueous leach liquor further comprises at least 1.9 grams of dissolved copper per liter of initial aqueous leach liquor.

8. The process of claim 1, wherein the initial aqueous leach liquor further comprises at least 13.7 grams of dissolved copper per liter of initial aqueous leach liquor.

9. The process of claim 1, wherein the initial aqueous leach liquor further comprises between 1.9 grams and 13.7 grams of dissolved copper per liter of initial aqueous leach liquor.

10. The process of claim 1, wherein the step of contacting the leach liquor with the copper mass comprises circulating the aqueous leach liquor through the batch reactor with a circulation pump, wherein the copper mass is a three dimensional open network that is immersed in the leach liquor and is permeable to the leach liquor.

11. The process of claim 10, wherein said circulating comprises withdrawing aqueous leach liquor from the batch reactor at a location below the copper mass and reintroducing the withdrawn aqueous leach liquor at a location above the copper mass.

12. The process of claim 10, wherein said circulating comprises withdrawing aqueous leach liquor at a rate of about 0.1 to 0.182 of the aqueous leach liquor volume per minute from the batch reactor at a location below the copper mass and reintroducing the withdrawn aqueous leach liquor at a location above the copper mass.

13. The process of claim 1, wherein the step of contacting the leach liquor with the air, oxygen, or mixture thereof and with the copper mass comprises circulating the aqueous leach liquor through the batch reactor with a circulation pump, wherein the copper mass is a three dimensional open network that is immersed in the leach liquor and is permeable to the leach liquor, and sparging the air, oxygen, or mixture thereof upward through the copper mass and aqueous leach liquor.

14. The process of claim 13, wherein said circulating comprises withdrawing aqueous leach liquor from the batch reactor at a location below the copper mass and reintroducing the withdrawn aqueous leach liquor at a location above the copper mass.

15. The process of claim 13, wherein said circulating comprises withdrawing aqueous leach liquor at a rate of about 0.1 to 0.182 of the aqueous leach liquor volume per minute from the batch reactor at a location below the copper mass and reintroducing the withdrawn aqueous leach liquor at a location above the copper mass.

16. The process of claim 1, wherein the temperature of the leach liquor is maintained at a temperature between 40° C. and 80° C.

17. The process of claim 1, further comprising maintaining the pH of the aqueous leach liquor between about 8 and about 11.3 by adding monoethanolamine as a base and carbon dioxide as an acid.

18. The process of claim 1, further comprising maintaining the pH of the aqueous leach liquor between about 9 and about 10.

19. The process of claim 1, wherein the aqueous leach liquor is free of alkali metal hydroxides.

20. The process of claim 1, wherein the aqueous leach liquor is free of polyamines and alcohols.

21. The process of claim 1, wherein the aqueous leach liquor is free of carboxylic acids.

22. The process of claim 1, wherein the aqueous leach liquor is free of ammonium hydroxide.

23. The process of claim 1, wherein the molar ratio of copper to total monoethanolamine in the copper-containing aqueous solution product is less than 1 to 3.5.

24. The process of claim 1, wherein the weight of the copper mass provided to the batch reactor is between 2/3 and 1 grams per ml of aqueous leach liquor provided to the batch reactor.

25. The process of claim 1, wherein the step of contacting the leach liquor with the air, oxygen, or mixture thereof comprises immersing the copper mass in the aqueous leach liquor, wherein the copper mass is a three dimensional open network that is permeable to the leach liquor, and introducing the air, oxygen, or mixture thereof at a point below the top of the leach liquor such that the air, oxygen, or mixture thereof migrates upward through the aqueous leach liquor contacting the copper mass.

26. The process of claim 1, wherein the temperature of the leach liquor is maintained at a temperature between 40° C. and 80° C.

27. The process of claim 26, wherein the pH of the aqueous leach liquor is between about 8 and about 11.3.

28. The process of claim 26, wherein air is provided to the batch reactor at a rate of between about 2 and about 20 standard cubic feet per hour per liter of the total volume of the leach liquor and the copper.

29. The process of claim 1, wherein the batch reactor is an aerated packed tower containing the copper mass and the aqueous leach liquor, wherein the aqueous leach liquor is circulated from the bottom of the packed tower to the top of the packed tower.

30. The process of claim 1, wherein the average rate of dissolution of copper mass is at least 17 grams of copper metal dissolved per liter of aqueous leach liquor per hour.

31. The process of claim 1, wherein the batch reactor is adapted to be rotated while being aerated.

32. The process of claim 1, wherein the weight of the copper mass provided to the batch reactor is between 2/3 and 1 grams per ml of aqueous leach liquor provided to the batch reactor, and wherein the copper mass comprises irregular shaped pieces having an average dimension of about 1 inch to about 3 inches.

33. The process of claim 1, the copper mass comprises copper wire.

34. The process of claim 1, the copper mass consists essentially of copper tubing, copper cabling, copper plates, copper wire, blister shot, or any mixture thereof.

35. A continuous process for producing a copper-containing aqueous solution product, said process comprising:
provided to a continuous reactor in the form of a tower substantially packed with copper mass;
providing an aqueous leach liquor comprising water, a first concentration of dissolved copper, monoethanolamine, and $(HMEA)_2CO_3$, wherein said $(HMEA)_2CO_3$ is produced by contacting aqueous monoethanolamine with carbon dioxide, and wherein the temperature of the aqueous leach liquor is maintained at a temperature between 25° C. and 100° C.;
providing to the continuous reactor air, oxygen, or mixture thereof, and
contacting the leach liquor with the air, oxygen, or mixture thereof and with the copper mass, thereby causing dissolution of a portion of the copper mass and forming the copper-containing aqueous solution product comprising a second concentration of dissolved copper, wherein the second concentration is higher than the first concentration and is between 100 and 130 grams of dissolved copper per liter, and wherein the copper dissolution rate is between about 3.65 and about 9.27 grams of copper mass dissolved per liter of aqueous leach liquor per hour.

36. The process of claim 35, wherein the step of partially carbonating the monoethanolamine comprises contacting an aqueous monoethanolamine composition with carbon dioxide, and wherein the aqueous leach liquor comprises between about 30% and about 40% by weight of total monoethanolamine and between about 5% and about 30% by weight of carbon dioxide.

37. The process of claim 35, wherein the temperature of the leach liquor is maintained at a temperature between 40° C. and 80° C.

38. The process of claim 35, wherein the temperature of the leach liquor is maintained at a temperature between 45° C. and 65° C.

39. The process of claim 35, wherein the step of providing an aqueous leach liquor comprising water, a first concentration of dissolved copper, monoethanolamine, and $(HMEA)_2CO_3$ comprises:
providing a first portion of copper-containing aqueous solution product previously produced,
admixing with the first portion a second portion of aqueous monoethanolamine, and
adding carbon dioxide to maintain the pH of the resultant aqueous leach liquor comprising the first concentration of dissolved copper at a value between 8 and 11.3.

40. The process of claim 39, wherein the temperature of the leach liquor is maintained at a temperature between 40° C. and 80° C.

41. The process of claim 39, wherein the temperature of the leach liquor is maintained at a temperature between 45° C. and 65° C.

42. The process of claim 39, wherein the pH of the aqueous leach liquor is maintained between about 9 and about 10.

43. The process of claim 35, wherein the weight of the copper mass is between 2/3 and 1 grams per ml of aqueous leach liquor.

44. The process of claim 35, wherein the step of contacting the leach liquor with the air, oxygen, or mixture thereof comprises immersing the copper mass in the aqueous leach liquor, wherein the copper mass is a three dimensional open network that is permeable to the leach liquor, and introducing the air, oxygen, or mixture thereof at a point below the top of the leach liquor such that the air, oxygen, or mixture thereof migrates upward through the aqueous leach liquor contacting the copper mass.

45. The process of claim 44, wherein air is provided to the continuous reactor at a rate of between about 2 and about 20 standard cubic feet per hour per liter of the total volume of the leach liquor and the copper.

46. The process of claim 44, wherein the continuous reactor is an aerated packed tower containing the copper mass and the aqueous leach liquor, wherein the aqueous leach liquor is circulated from the bottom of the packed tower to the top of the packed tower.

47. The process of claim 35, wherein the continuous reactor is adapted to be rotated while being aerated.

48. The process of claim 35, wherein the weight of the copper mass provided to the continuous reactor is between 2/3 and 1 grams per ml of aqueous leach liquor provided to the continuous reactor, and wherein the copper mass comprises irregular shaped pieces having an average dimension of about 1 inch to about 3 inches.

49. The process of claim 35, the copper mass comprises copper wire.

50. The process of claim 35, the copper mass consists essentially of copper tubing, copper cabling, copper plates, copper wire, blister shot, or any mixture thereof.

51. The process of claim 35, wherein the step of contacting the leach liquor with the copper mass comprises circulating the aqueous leach liquor through the continuous reactor with a circulation pump, wherein the copper mass is a three dimensional open network that is immersed in the leach liquor and is permeable to the leach liquor.

52. The process of claim 51, wherein said circulating comprises withdrawing aqueous leach liquor from the batch reactor at a location below the copper mass and reintroducing the withdrawn aqueous leach liquor at a location above the copper mass.

53. The process of claim 51, wherein said circulating comprises withdrawing aqueous leach liquor at a rate of about 0.1 to 0.325 of the aqueous leach liquor volume per minute from the continuous reactor at a location below the copper mass and reintroducing the withdrawn aqueous leach liquor at a location above the copper mass.

54. The process of claim 35, wherein the step of contacting the leach liquor with the air, oxygen, or mixture thereof and with the copper mass comprises circulating the aqueous leach liquor through the batch reactor with a circulation pump, wherein the copper mass is a three dimensional open network that is immersed in the leach liquor and is permeable to the leach liquor, and sparging the air, oxygen, or mixture thereof upward through the copper mass and aqueous leach liquor.

55. A process for producing a copper-containing aqueous solution product, said process comprising:
providing to a reactor an initial aqueous leach liquor comprising water, monoethanolamine, and (HMEA)

$_2CO_3$, wherein said $(HMEA)_2CO_3$ is produced by partially carbonating aqueous monoethanolamine;

providing to the reactor a copper mass, wherein the weight of the copper mass provided to the batch reactor is between 2/3 and 1 grams per ml of aqueous leach liquor provided to the reactor;

providing to the reactor air, oxygen, or mixture thereof and contacting the leach liquor with the air, oxygen, or mixture thereof and with the copper mass, thereby causing dissolution of a portion of the copper mass and forming the copper-containing aqueous solution product, wherein the temperature of the leach liquor is maintained at a temperature between 40° C. and 80° C., wherein the amount of dissolved copper in the copper-containing aqueous solution product is between 100 grains per liter and 130 grams per liter in 12 hours or less.

56. The process of claim 55, wherein the step of contacting the leach liquor with the copper mass comprises circulating the aqueous leach liquor by withdrawing aqueous leach liquor from the reactor at a location below the copper mass and reintroducing the withdrawn aqueous leach liquor at a location above the copper mass, wherein the copper mass is a three dimensional open network that is immersed in the leach liquor and is permeable to the leach liquor, and providing the air, oxygen, or mixture thereof at a location below the copper mass.

57. A process for producing a copper-containing aqueous solution product, said process comprising:

providing to a reactor an initial aqueous leach liquor comprising water, monoethanolamine, and $(HMEA)_2CO_3$, wherein said $(HMEA)_2CO_3$ is produced by partially carbonating aqueous monoethanolamine;

providing to the reactor a copper mass, wherein the copper mass is a three dimensional open network that is immersed in the leach liquor and is permeable to the leach liquor, and wherein the amount of copper mass is such that the height of the copper mass is substantially the same as the height of the top surface of the aqueous leach liquor;

providing to the batch reactor air, oxygen, or mixture thereof and contacting the leach liquor with the air, oxygen, or mixture thereof and with the copper mass, thereby causing dissolution of a portion of the copper mass and forming the copper-containing aqueous solution product, wherein the temperature of the leach liquor is maintained at a temperature between 40° C. and 80° C., wherein the average dissolution rate of copper is at least 17 grams per hour per liter of aqueous leach liquor.

58. The process of claim 57, wherein the step of contacting the leach liquor with the copper mass comprises circulating the aqueous leach liquor by withdrawing aqueous leach liquor from the reactor at a location below the copper mass and reintroducing the withdrawn aqueous leach liquor at a location above the copper mass, wherein the copper mass is a three dimensional open network that is immersed in the leach liquor and is permeable to the leach liquor, and providing the air, oxygen, or mixture thereof at a location below the copper mass.

* * * * *